Dec. 24, 1957     J. ISREELI     2,817,313
HOLDER FOR MICROSCOPE SLIDES
Filed July 20, 1955
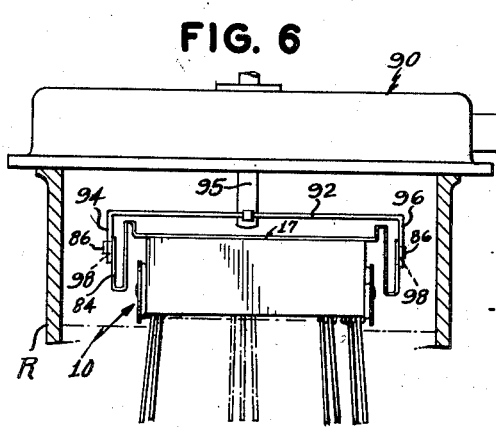
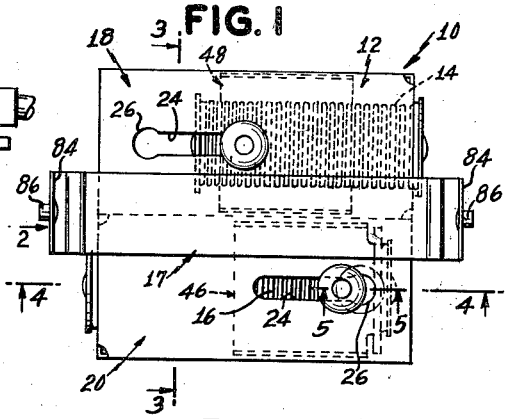
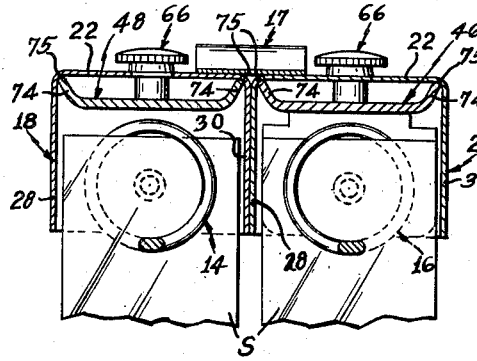
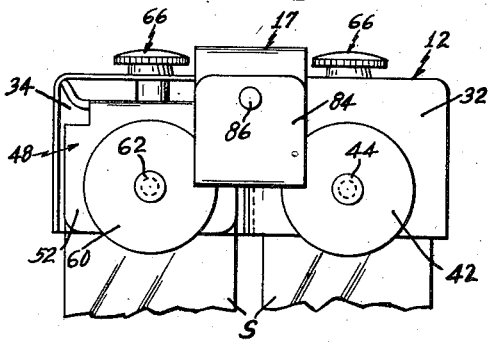
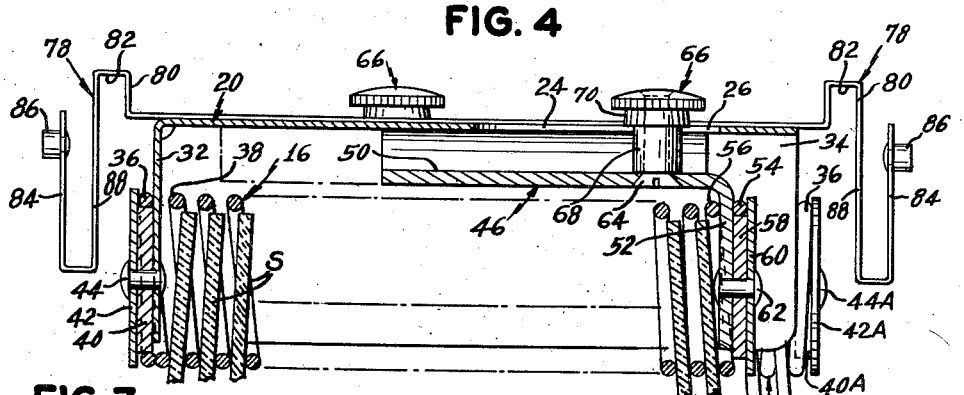
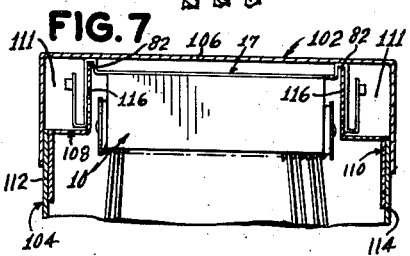
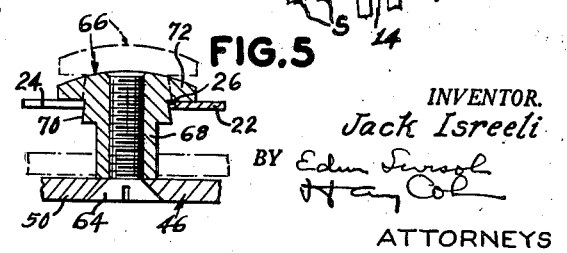
INVENTOR.
Jack Isreeli
BY
ATTORNEYS

United States Patent Office 2,817,313
Patented Dec. 24, 1957

2,817,313

HOLDER FOR MICROSCOPE SLIDES

Jack Isreeli, Tuckahoe, N. Y., assignor to Technicon International Ltd., Chauncey, N. Y., a corporation of New York Application July 20, 1955, Serial No. 523,287

3 Claims. (Cl. 118—503)

The present invention relates to holders for microscope slides which are usually referred to as micro-slides.

The primary object of the present invention is the provision of a micro-slide holder which is particularly well adapted for holding a plurality of slides during the treatment and preparation of the tissue specimens mounted on the slides.

Another object is the provision of a slide holder which enables a comparatively large number of slides to be treated simultaneously such as, for example, during the staining and drying of the tissue specimens.

A further object is the provision of a slide holder which is of generally simplified construction, relatively inexpensive to manufacture and highly efficient in use.

The above and other objects, features and advantages of the present invention will be more fully understood from the following description considered in connection with the accompanying illustrative drawings.

In the drawings:

Fig. 1 is a top plan view of a slide holder pursuant to the present invention;

Fig. 2 is an end view, on an enlarged scale, taken in the direction of the arrow 2 in Fig. 1 micro-slides being illustrated in position within the holder, with portions of the slides broken away;

Fig. 3 is a sectional view, on an enlarged scale, taken on the line 3—3 of Fig. 1;

Fig. 4 is a sectional view, on an enlarged scale, taken on the line 4—4 of Fig. 1;

Fig. 5 is a fragmentary sectional view, on an enlarged scale taken on the line 5—5 of Fig. 1;

Fig. 6 is a fragmentary view, partly in elevation and partly in section, showing the slide holder associated with an operating part of an automatic immersion apparatus; and Fig. 7 is a sectional view showing the slide holder associated with part of an automatic dryer.

Referring now to Figs. 1 through 5 of the drawings in detail, there is illustrated a slide holder 10 pursuant to the present invention. The slide holder 10 comprises a frame or housing assembly 12 having provision to mount two helically coiled springs 14 and 16 and a bracket member 17 which is utilized to support the slide holder, as hereinafter described in detail.

The frame assembly 12 is constituted by a pair of channel members 18 and 20, each preferably formed in one piece from suitable sheet material. Each channel member is provided with a base wall 22, in which there is defined a slot 24 having an enlarged end 26. Opposing side walls 28 and 30 extend forwardly from the base wall and provision is made for one end wall 32, the other end of the channel member being open as at 34. The channel members 18 and 20 are preferably spot welded together, being disposed with wall 30 of channel 18 in securement with wall 28 of channel 20, as illustrated in Fig. 3. Consequently, it will be noted, as best illustrated in Fig. 2, that at each end thereof, the frame or housing assembly 12 has the end wall 32 of one channel member adjacent the open end 34 of the other channel member, and the enlarged ends 26 of the slots 24 are adjacent opposite ends, respectively, of the housing assembly as illustrated in Fig. 1.

Provision is made to dispose each of the helically coiled springs 14 and 16 in the frame assembly 12, with the springs in side by side disposition, but separated by a longitudinal barrier constituted by the spot welded channel walls 28 and 30, and with the longitudinal extent of each spring parallel to the associated base wall 22 of the frame assembly. In this connection, it will be noted from Fig. 4 that the adjacent end convolutions 36 and 38, at one end of the spring 16, straddle the end wall 32 of the channel member 20, the convolution 36 being disposed about a spacer 40 which is interposed between the end wall 32 and a retainer 42. The spacer 40 is secured in position on the end wall 32 by a rivet 44 which secures the retainer 42 in position on the spacer 40. Adjacent end convolutions 36 and 38 of the spring 14 similarly straddle the end wall 32 of the channel 18, at the other end of the frame assembly, the convolution 36 being retained in position by a spacer 40A and retainer 42A riveted to said latter end wall, as at 44A in Fig. 4. The other end of the spring 16 is secured to a slide 46, and the other end of the spring 14 is similarly secured to a similar slide 48. Each slide is a substantially L-shaped member formed by right angularly related walls 50 and 52. The wall 52 of each slide mounts the other end of the associated spring. More specifically, as best illustrated in Fig. 4 with reference to the spring 16, the adjacent end convolutions 54 and 56 thereof straddle the wall 52 of the slide 46. The end convolution 54 is seated on a spacer 58 between the wall 52 and a retainer 60. The wall 52, the spacer 58 and the retainer 60 are riveted together, as at 62. It will be understood that the other end of the spring 14 is similarly secured to the wall 52 of the associated slide 48, as best illustrated in Figure 2.

In order to mount each slide for movement longitudinally of its associated channel member, the wall 50 of each slide is secured by a screw 64 engaged into an internally threaded member or button 66 mounted in the associated slot 24. The button 66 has a shank 68 which extends through the slot 24 and is provided with a shoulder portion 70 of greater diameter than the widthwise dimension of the slot laterally of the enlarged end 26 so as to ride on the outer surface of the wall 22 of the associated channel member, as in Fig. 4. However it will be noted that the diameter of the enlarged end portion 26 of each slot is greater than the diameter of the shoulder portion 70 of the button, as best illustrated in Fig. 5, which shows in full line the shoulder portion 70 inserted into a slot portion 26 and the enlarged finger piece or head 72 of the slide button 66 in abutment with the outer surface of the wall 22. From the foregoing it will be apparent that each spring is anchored at one end to the housing 12 and the other end thereof is mounted for movement on a slide member 46, with the anchored end of one spring adjacent the movable end of the other spring. The slide members are movable in opposite directions, respectively, toward the enlarged end 26 of the associated slot 24 for expanding the associated spring, the spring being retained in the expanded condition thereof when the associated button 66 is moved from the broken line position thereof, in Fig. 5, to the full line position thereof to engage the shoulder 70 in the slot portion 26.

Each of the springs in its contracted condition is shorter in length than the companion channel member or frame compartment constituted thereby, as shown for example with reference to the spring 14 in Fig. 1 wherein the spring is shown in its axially contracted condition. However, the spring is resiliently movable to an axially expanded condition, as shown for example by the spring 16 in Fig. 4. It will therefore be understood that each of the springs 14 and 16 is resiliently movable from its axially contracted condition to an axially expanded condition. During said movements of each spring, the associated slide 46 is guided during its movement lengthwise of the associated channel member or compartment 18 or 20, as the case may be, by the outwardly directed flaring portions or wings 74 provided at each of the opposite marginal side edges of the slide wall 50, as best illustrated in Fig. 3. It will be noted from this figure that the wings abut the corners 75 of the associated channel members 18 and 20, so as to guide the slides 46 for movement in the associated channel members.

It will be understood that when the springs are expanded, so that the adjacent convolutions are spaced from each other, as illustrated in Fig. 4 with reference to spring 16, the insertion of micro-slides in position between adjacent spring convolutions is facilitated, and that when the spring is released from its expanded condition the slides are resiliently gripped by and thereby held between, the adjacent spring convolutions. Thus, as shown in Fig. 4, the micro-slides S are positioned between adjacent companion spring convolutions and are thus resiliently secured and held in position in the frame. It will be understood that although only a few micro-slides have been shown, the construction and arrangement is such that a slide may be mounted between each two adjacent convolutions of each spring, whereby the slide holder has a desirably large slide holding capacity. The springs have a low pitch so that the slides are positioned substantially at right angles to the parallel side walls 28 and 30 of the associated frame compartment.

The previously mentioned bracket 17 is secured to the frame 12 longitudinally thereof, preferably by being spot welded thereto in position substantially centrally between the wall 28 of the compartment 18 and the wall 30 of the compartment 20, as best illustrated in Fig. 3. The bracket is utilized to mount the slide holder in position in an associated apparatus during the processing or other treatment of the slides. In this connection, it will be noted that the bracket 17 is provided at each end thereof with a formation 78 which is preferably integral therewith. Said formation extends outwardly of the adjacent end of the holder 10 and, being free of securement to the holder, has the inherent resiliency of the material of which the bracket 17 is formed, preferably stainless steel having a hard spring temper. Each formation 78 has a portion 80 which is upwardly directed from the bracket 17 to define a seat 82. In addition, each formation 78 includes an upwardly directed free end part 84 which is provided with an outwardly directed pin 86. Due to the previously described inherent resiliency of the material of which the bracket 17 is fabricated, it will be understood that the free end part 84 may be resiliently urged toward the opposing portion 88 of the formation 78.

Referring now to Figure 6, the slide holder 10 is illustrated in association with a receptacle R of an automatic immersion apparatus, such as that shown, for example, in Patent No. 2,341,198 to E. C. Weiskopf, dated September 12, 1950 and assigned to the assignee hereof. As fully illustrated and described in said patent, provision is made for a series of receptacles R which contain various liquids into which the slides are automatically immersed, in succession, to provide for the staining of the specimens carried by the slides. A part of such automatic immersion apparatus is generally indicated by the reference numeral 90 and said part is provided with a bracket member 92 by which the slide holder 10 may be attached to the companion part of the automatic immersion apparatus. The bracket member 92 is in the form of a rigid metal strap having confronting end portions 94 and 96 which are provided with the apertures 98 into which the pins 86, provided on the holder bracket 78 may be releasably engaged, whereby to support the slide holder in the position thereof illustrated in Fig. 6.

In this manner the slides carried by the slide holder may be immersed in the liquid provided in the receptacle R of the immersion apparatus. It will be understood that, due to the previously described resiliency of the end portions 84 of the holder bracket 17, said end portions may be resiliently urged toward the associated bracket portions 88 for inserting the pins 86 into the apertures 98, respectively, and for withdrawing said pins from said apertures to readily remove the slide holder from the bracket 92 of the operating part 90 of the automatic immersion apparatus. The bracket member 92 is attached to the rotary shaft 95 of the device 90, which may be the same as the device 100 of the automatic immersion apparatus shown in said patent.

Referring now to Figure 7, the slide holder 10 of the present invention is shown in association with a micro-slide drying apparatus 102, of the type illustrated in Patent No. 2,623,301 to E. C. Weiskopf, dated December 30, 1952, and assigned to the assignee hereof. As here shown, the dryer 102 is provided with a casing 104 having a removable closure 106. The casing 104 is provided with longitudinally extending angle members 108 and 110, at opposite sides thereof, which are suitably secured below the upper edges of the opposing side walls 112 and 114, respectively of the casing 104. The upper ends of the angle members 108 and 110 are inwardly offset from the associated side walls, providing recesses 111 to receive the portions 84 and 88 of the formations 78 of the strap or bracket 17. More specifically, it will be noted that the inwardly offset end portions 116 of the angle members 108 and 110 are received within the seats 82 of the bracket 17 so as to position the slide holder 10 centrally of the casing 104, widthwise thereof, to register the assemblage of the slides S with a heater provided within the dryer, as fully illustrated and described in said latter patent.

As previously explained, each of the springs 14 and 16 is rigidly mounted at the opposite ends thereof, one end being rigidly mounted on an end wall of the associated channel member and the other end being rigidly mounted on the opposing end wall of the associated slide so as to retain each spring against possible rotation relative to its longitudinal axis and to prevent outward movement of the spring between the rigidly supported ends thereof. The slides S may be inserted almost to the inner diameter of the coils of the spring, as best illustrated in Fig. 4. As a result of the compressing force of the spring adjacent the inner ends of the slides, the slides flair out, relative to each other, when held by the spring, as will be apparent from Figs. 4 and 6. This flairing effect is aided by the previously described rigid end support at each end of each spring which prevents the spring from adjusting itself by rotation relative to its longitudinal axis to compensate for the greater pull or compression thereof adjacent the inner ends of the slides. The flairing effect of the slides is highly desirable because it creates a bigger air space between slides and therefore provides a more effective draining action even with the use of comparatively small gauge springs having a comparatively small pitch.

While the slide holder is intended primarily for use in connection with the staining or drying of slides, and is well adapted for those purposes, for use both in the aforesaid automatic immersion apparatus and in the drying apparatus, the slide holder may be used generally for holding slides and the invention may be embodied in means for holding slides during the storage thereof, as for example, in a slide cabinet. It will also be understood that while the slide holder of the present invention has been illustrated as provided with two springs, it will be understood that it is within the scope of the present invention to provide a slide holder having one spring or more than two springs.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. In a micro-slide holder, comprising a frame open at one side for the projection of slides therethrough and having a wall opposite said open side and having spaced confronting side walls, a helical spring disposed between said confronting side walls and axially expansible and contractible longitudinally of the latter and of said opposite wall, one end of said spring being fixed in said frame and the other end being movable for the axial expansion and contraction of the spring, a member interposed between said spring and one of said walls and movable between said confronting walls and secured to the other end of the spring for expanding and contracting the latter, one of said walls having a slot extending longitudinally of the spring, and a member projecting through said slot and connected to said interposed member and movable longitudinally of said slot for expanding and contracting said spring, the improvement comprising said slot having an enlarged portion and said projecting member having an enlarged portion movable transversely of the plane of said slotted wall into said enlarged portion of said slot in the expanded condition of said spring for releasably holding the spring in said expanded condition, and said spring biasing said enlarged portion of said projecting member into said enlarged portion of said slot.

2. In a micro-slide holder, comprising a frame open at one side for the projection of slides therethrough and having a wall opposite said open side and having spaced confronting side walls, a helical spring disposed between said confronting side walls and axially expansible and contractible longitudinally of the latter and of said opposite wall, one end of said spring being fixed in said frame and the other end being movable for the axial expansion and contraction of the spring, and means guiding said spring for said expansion and contraction and preventing bodily movement of said spring transversely of said confronting walls, the improvement comprising said opposite wall having a longitudinal slot extending longitudinally of the spring and having an enlarged portion in juxtaposition to the position of the free end portion of the spring in the expanded condition of the latter, and a member projecting through said slot and operatively connected to said free end portion of said spring for moving the latter to an expanded condition, said projecting member having an enlarged portion movable transversely of the plane of said opposite wall into said enlarged portion of said slot in the expanded condition of said spring for releasably holding the spring in said expanded condition, and said spring biasing said enlarged portion of said projecting member into said enlarged portion of said slot.

3. In a micro-slide holder, comprising a frame having a wall provided with a longitudinal slot, a helical spring extending longitudinally of said wall and said slot adjacent thereto, means fixing one end of said spring in relation to said wall, and means projecting through said slot and connected to the other end of said spring for expanding the latter, the improvement comprising said slot having an enlarged portion in juxtaposition to the position of said other end portion of the spring in the expanded condition of the latter and said projecting means having an enlarged portion movable transversely of the plane of said wall into said enlarged portion of the slot when said spring is in said expanded condition whereby to hold the spring releasably under tension in said expanded condition, and said spring biasing said enlarged portion of said projecting member into said enlarged portion of said slot.

References Cited in the file of this patent

UNITED STATES PATENTS

| | | |
|---|---|---|
| 312,742 | Meinhardt | Feb. 24, 1885 |
| 791,158 | Miknlich | May 30, 1905 |
| 1,205,747 | Kawate | Nov. 21, 1916 |
| 1,542,182 | Spaziante | June 16, 1925 |
| 1,698,396 | Ducharme | Jan. 8, 1929 |
| 2,058,128 | Brubach | Oct. 20, 1936 |
| 2,463,664 | Watson | Mar. 8, 1949 |
| 2,522,416 | Weiskopf | Sept. 12, 1950 |
| 2,539,802 | Weiskopf | Jan. 30, 1951 |
| 2,572,434 | Blum | Oct. 31, 1951 |
| 2,619,233 | Weiskopf | Nov. 25, 1952 |